United States Patent
Hardjasa

(10) Patent No.: US 10,275,708 B2
(45) Date of Patent: **\*Apr. 30, 2019**

(54) CRITERIA ENHANCEMENT TECHNIQUE FOR BUSINESS NAME CATEGORIZATION

(71) Applicant: Yardi Systems, Inc., Goleta, CA (US)

(72) Inventor: Amelia Hardjasa, Vancouver (CA)

(73) Assignee: Yardi Systems, Inc., Goleta, CA (US)

(\*) Notice: Subject to any disclaimer, the term of this patent is extended or adjusted under 35 U.S.C. 154(b) by 848 days.

This patent is subject to a terminal disclaimer.

(21) Appl. No.: 14/923,740

(22) Filed: Oct. 27, 2015

(65) Prior Publication Data

US 2017/0116516 A1 Apr. 27, 2017

(51) Int. Cl.
*G06N 3/08* (2006.01)
*G06Q 10/06* (2012.01)
*G06F 16/28* (2019.01)

(52) U.S. Cl.
CPC ............. *G06N 3/08* (2013.01); *G06F 16/285* (2019.01); *G06Q 10/0631* (2013.01)

(58) Field of Classification Search
CPC ...................................................... G06N 3/08
See application file for complete search history.

(56) References Cited

U.S. PATENT DOCUMENTS

| | | |
|---|---|---|
| 5,396,580 A | 3/1995 | Fu |
| 6,119,112 A | 9/2000 | Bush |
| 6,868,411 B2 | 3/2005 | Shanahan |
| 6,917,952 B1 | 7/2005 | Dailey et al. |
| 8,478,054 B2 | 7/2013 | Sun |
| 8,719,260 B2 | 5/2014 | Betz |
| 8,812,435 B1 | 8/2014 | Zhao |
| 8,825,471 B2 | 9/2014 | Betz et al. |
| 8,843,486 B2 | 9/2014 | Merrigan et al. |
| 2005/0080613 A1* | 4/2005 | Colledge ............. G06F 17/2785 704/9 |

(Continued)

FOREIGN PATENT DOCUMENTS

AU 2015201773 B1 10/2015

OTHER PUBLICATIONS

Chawla, Nitesh V. et al. "SMOTE: Synthetic Minority Oversampling Technique." *Journal of Artificial Intelligence Research* 16 Jun. 2002. pp. 321-357.

*Primary Examiner* — Paulinho E Smith
(74) *Attorney, Agent, or Firm* — Socal IP Law Group LLP; Steven C. Sereboff; Angelo Gaz

(57) ABSTRACT

An energy management system includes a neural network, a predictive model, and a dictionary reducer. The network iteratively calculates weights, resulting in a final set, for each of single-word terms and trigram terms of training data business names, each of the weights indicative of a likelihood of correlating a business category. The predictive employs sets of the weights to predict a first corresponding one of the plurality of business categories for each of the training data business names until employment of the final set accurately predicts a correct business category for the each of the training data business names, and subsequently employs the final set of the weights to predict a second corresponding one of the plurality of business categories for each of a plurality of operational business names. The dictionary reducer eliminates unessential terms taken to determine the plurality of single-word terms and trigram terms.

21 Claims, 8 Drawing Sheets

(56) References Cited

U.S. PATENT DOCUMENTS

| | | | |
|---|---|---|---|
| 2009/0150341 A1 | 6/2009 | Paek et al. | |
| 2011/0320186 A1* | 12/2011 | Butters | G06F 17/278 704/9 |
| 2013/0024407 A1* | 1/2013 | Thompson | G06F 17/274 706/12 |
| 2014/0229164 A1 | 8/2014 | Martens et al. | |
| 2017/0115682 A1* | 4/2017 | Hardjasa | G05F 1/66 |
| 2017/0115683 A1* | 4/2017 | Hardjasa | G05B 13/027 |
| 2017/0116516 A1* | 4/2017 | Hardjasa | G06N 3/08 |
| 2017/0116536 A1* | 4/2017 | Hardjasa | G06N 7/005 |
| 2017/0116537 A1* | 4/2017 | Hardjasa | G06N 7/005 |
| 2017/0116685 A1* | 4/2017 | Hardjasa | G06Q 50/06 |

\* cited by examiner

PRESENT DAY ENERGY USE CONTROL SYSTEM

*FIG. 2 (Prior Art)*
PRESENT DAY BUSINESS CATEGORY DATABASE

| 201 | 202 | 203 |
|---|---|---|
| FIRST BAPTIST CHURCH | 45607 | RELIGIOUS INSTITUTION |
| CHURCH CHICKEN | 45607 | RELIGIOUS INSTITUTION |
| CHICKEN ROAD CHURCH | 24534 | POULTRY FARM |
| BOOT SCOOTERS | 11159 | MOTORCYLE SHOP |
| DENISE'S BEAUTY SALON | 98234 | HAIRSTYLING ESTABLISHMENT |
| DENISE'S BEAUTIES | 39478 | MODELING AGENCY |

CRITERIA ENHANCEMENT TECHNIQUE FOR BUSINESS NAME CATEGORIZATION

CROSS-REFERENCE TO RELATED APPLICATIONS

This application is related to the following co-pending U.S. Patent Applications, each of which has a common assignee and common inventor: U.S. patent application Ser. No. 14/923,581, filed Oct. 27, 2015, entitled "APPARATUS AND METHOD FOR EFFICIENT BUSINESS NAME CATEGORIZATION," U.S. patent application Ser. No. 14/923,680, filed Oct. 27, 2015, entitled "DICTIONARY REDUCTION TECHNIQUE FOR BUSINESS NAME CATEGORIZATION," U.S. patent application Ser. No. 14/923,720, filed Oct. 27, 2015, entitled "DICTIONARY ENHANCEMENT TECHNIQUE FOR BUSINESS NAME CATEGORIZATION," U.S. patent application Ser. No. 14/923,642, filed Oct. 27, 2015, entitled "EXTENDED BUSINESS NAME CATEGORIZATION APPARATUS AND METHOD," and U.S. patent application Ser. No. 14/923,757, filed Oct. 27, 2015, entitled "INTERPOLATIVE VERTICAL CATEGORIZATION MECHANISM FOR ENERGY MANAGEMENT."

BACKGROUND OF THE INVENTION

Field of the Invention

This invention relates in general to the field of building energy management, and more specifically to an apparatus and method for efficient business name categorization.

Description of the Related Art

The problem with resources such as electrical power, water, fossil fuels, and their derivatives (e.g., natural gas) is that the generation and consumption of a resource both vary with respect to time. Furthermore, the delivery and transport infrastructure is limited in that it cannot instantaneously match generation levels to provide for consumption levels. The delivery and transport infrastructure is limited in supply and the demand for this limited supply is constantly fluctuating. As anyone who has participated in a rolling blackout will concur, the times are more and more frequent when resource consumers are forced to face the realities of limited resource supply.

Because of both popular and legislative pressures, the energy generation and distribution community has begun to take measures to manage their limited supplies of energy in the presence of diminishing management resources. This community, most prevalently seen in the case of electrical power, has begun to shift the burden of energy management (e.g., curtailment, load shifting, etc.) down to the consumer in the form of peak demand charges, time of use charges, etc. But management of peak energy use, time of energy use, load shifting, etc. is a very complex task for a utility, let alone for a consumer. At the residential level, energy management is less cumbersome, but this function becomes much more complex when dealing with business consumers that employ energy demanding devices (e.g., lighting systems, large ovens, industrial refrigeration, and hundreds to thousands of lights, to name a few) and that have defined hours of operation.

For example, consider a factory owner whose building includes 20 air conditioners, each consuming 10 kW when turned on. If they are all on at the same time, then the peak demand for that period is 200 kW. Not only does the energy supplier have to provide for instantaneous generation of this power in conjunction with loads exhibited by its other consumers, but the distribution network that supplies this peak power must be sized such that it delivers 200 kW. And in most cases, the factory owner will incur a peak demand surcharge to offset the costs of peak energy generation and distribution.

Though responsibility of energy management has shifted to the consumer, the actualization of management remains shared between the utility and the consumer, often times through third parties. These third parties and under contract to the utility to facilitate energy management by the utility's customers, and the third parties profit from sharing in the cost savings that they are able to achieve with the utility's customers.

Various mechanisms exist today for perfecting energy management which include demand reduction programs, energy efficiency programs, online solicitations, text messaging, and direct mail. Many of these mechanisms employ on-site special monitoring and control equipment provided by the third parties, which is coupled to network operations centers (NOCs) staffed by the third parties. In conjunction with requirements provided by the utilities, the NOCs issued commands and directives over any number of communication channels that cause—directly or indirectly—these consumers to reduce consumption, load shift, perform upgrades to more energy efficient devices, and etc., thereby satisfying the mandated energy management requirements. Generally speaking, when a consumer is as closely coupled to a third party NOC so as to have on-site monitoring and control equipment, much is known about that consumer's type of business, internal equipment configuration, and other data that allows for commands and directives issued over the communication channels to be very effective at managing energy use. This is generally the case, but not always the case.

On the other extreme, a vast majority of a utility's consumers are only loosely coupled to a NOC. For this class of consumer, the NOC may only business names. In some cases, a utility may provide business type data obtain from a source such as Dunn & Bradstreet, but more often than not only the business names are known.

This disclosure deals with the problem of selecting effective and efficient control and monitoring message to be issued to a consumer having an unknown business type, or a business type that is obtained but questionable. For example, a message to that energy savings can be had by shifting heavy equipment operation hours to early in the morning is affective for "Bull's Body Shop," as long as Bull's Body Shop is indeed an automotive repair facility. But if this business were an exotic dance club or tattoo parlor, such a message about heaving equipment usage would be remarkably ineffective.

Therefore, what is needed is an apparatus and method for efficiently categorizing businesses based on their name alone.

What is also needed is a mechanism for managing energy usage for businesses whose business types are not known, where the mechanism does not require extraordinary computing resources (e.g., memory, throughput).

What is further needed is an automated technique for determining business categories associated with a substantial number of utility consumers that is memory and processing efficient.

SUMMARY OF THE INVENTION

The present invention, among other applications, is directed to solving the above-noted problems and addresses other problems, disadvantages, and limitations of the prior art by providing a superior technique for efficiently determining business categories corresponding to business names for purposes of identifying appropriate energy management messaging content.

In one embodiment, an energy management system is provided, for communicating with one or more buildings for purposes of managing energy consumption of devices within the buildings. The energy management system includes a neural network, a predictive model, and a dictionary reducer. The neural network is configured to iteratively calculate weights, resulting in a final set of the weights, for each of a plurality of single-word terms and trigram terms taken from training data business names, where each of the weights is indicative of a likelihood of correlating one of a plurality of business categories, and where the trigram terms each comprise three consecutive ones of the single-word terms as used in the training data business names. The predictive model is coupled to the neural network, and is configured to iteratively employ sets of the weights to predict a first corresponding one of the plurality of business categories for each of the training data business names until employment of the final set of the weights accurately predicts a correct business category for the each of the training data business names, and is configured to subsequently employ the final set of the weights to predict a second corresponding one of the plurality of business categories for each of a plurality of operational business names. The dictionary reducer is coupled to the neural network, and is configured to eliminate unessential single-word terms and trigram terms taken from the training data business names to determine the plurality of single-word terms and trigram terms, where the plurality of single-word terms and trigram terms is essential to predicting the correct business category for the each of the training data business names.

One aspect of the present invention contemplates an energy management system, for communicating with one or more buildings for purposes of managing energy consumption of devices within the buildings. The energy management system has a network operations center (NOC), coupled to each of the buildings via one or more communication channels. The NOC includes a neural network, a predictive model, and a dictionary reducer. The neural network is configured to iteratively calculate weights, resulting in a final set of the weights, for each of a plurality of single-word terms and trigram terms taken from training data business names, where each of the weights is indicative of a likelihood of correlating one of a plurality of business categories, and where the trigram terms each comprise three consecutive ones of the single-word terms as used in the training data business names. The predictive model is coupled to the neural network, and is configured to iteratively employ sets of the weights to predict a first corresponding one of the plurality of business categories for each of the training data business names until employment of the final set of the weights accurately predicts a correct business category for the each of the training data business names, and is configured to subsequently employ the final set of the weights to predict a second corresponding one of the plurality of business categories for each of a plurality of operational business names. The dictionary reducer is coupled to the neural network, and is configured to eliminate unessential single-word terms and trigram terms taken from the training data business names to determine the plurality of single-word terms and trigram terms, where the plurality of single-word terms and trigram terms is essential to predicting the correct business category for the each of the training data business names.

Another aspect of the present invention comprehends a method for communicating with one or more buildings for purposes of managing energy consumption of devices within the buildings. The method includes: via a neural network, iteratively calculating weights, resulting in a final set of the weights, for each of a plurality of single-word terms and trigram terms taken from training data business names, where each of the weights is indicative of a likelihood of correlating one of a plurality of business categories, and where the trigram terms each comprise three consecutive ones of the single-word terms as used in the training data business names; via a predictive model coupled to the neural network, iteratively employing sets of the weights to predict a first corresponding one of the plurality of business categories for each of the training data business names until employment of the final set of the weights accurately predicts a correct business category for the each of the training data business names, and subsequently employing the final set of the weights to predict a second corresponding one of the plurality of business categories for each of a plurality of operational business names; and via a dictionary reducer coupled to the neural network, eliminating unessential single-word terms and trigram terms taken from the training data business names to determine the plurality of single-word terms and trigram terms, where the plurality of single-word terms and trigram terms are essential to predicting the correct business category for the each of the training data business names.

BRIEF DESCRIPTION OF THE DRAWINGS

These and other objects, features, and advantages of the present invention will become better understood with regard to the following description, and accompanying drawings where:

FIG. 2 is a table depicting exemplary entries in a present day business category database;

DETAILED DESCRIPTION

Figure 1:
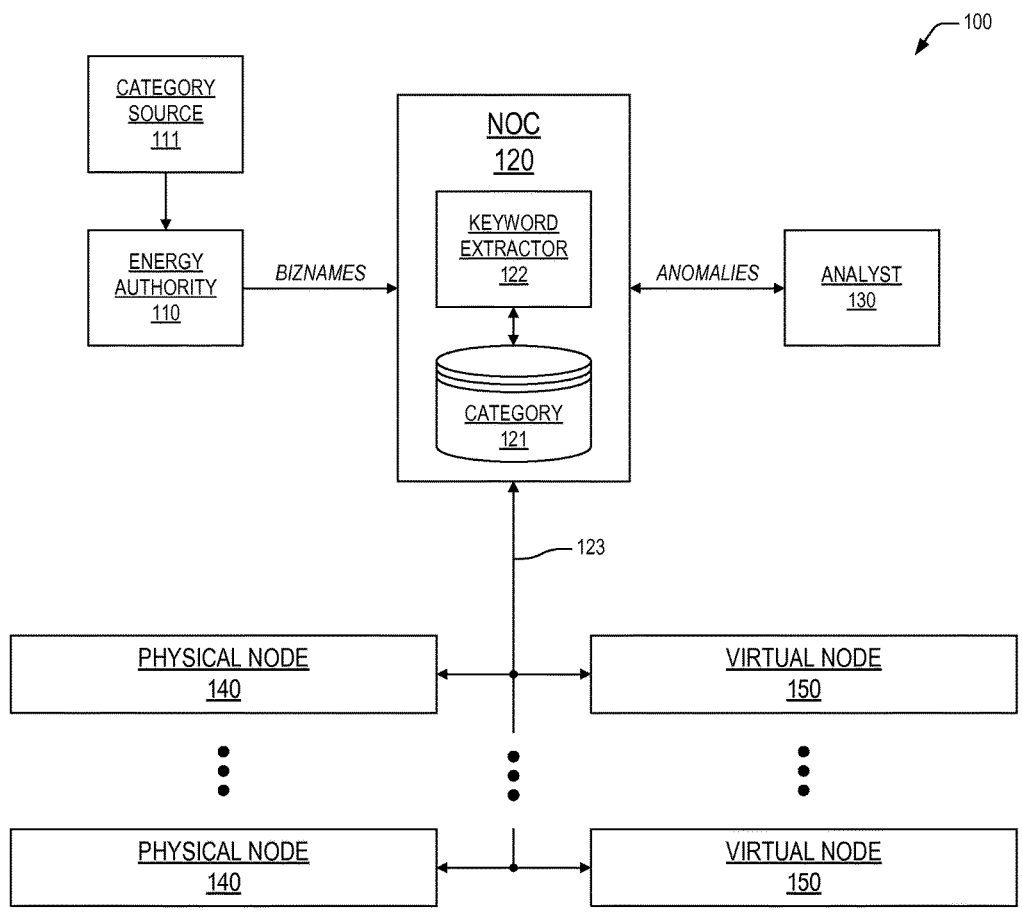
FIG. 1 is a block diagram illustrating a present day energy use control system.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on energy management and associated techniques employed within present day building automation systems for the generation energy efficiency prompts, a discussion of the limitations and disadvantages of these present day systems will be presented with reference to FIGS. 1-2. Following this, a discussion of the present invention be presented with reference to FIGS. 3-8.

Turning to FIG. 1, a block diagram is presented illustrating a present day energy use control system 100. The control system 100 has a network operations center (NOC) 120 that is operationally coupled to an energy authority 110 and one or more analysts 130. The NOC 120 is further coupled via one or more communication links 123 to one or more physical nodes 140 and one or more virtual nodes 150. The NOC 120 includes a keyword extractor 122 and a business category database 121. The energy authority 110 may optionally be operationally coupled to a category source 111.

Each of the one or more physical nodes 140 may comprise an energy management system disposed within a corresponding building configured to monitor energy usage by the corresponding building, including usage by one or more subsystems (e.g. air conditioning, refrigeration, heating, heavy equipment, fabrication systems, ovens, human transport, assembly robotics, etc.) within the facility. The energy management system may monitor additional local parameters such as outside temperature, inside temperatures, humidity, and occupancy, and report energy usage and monitored local parameters to the NOC at specified intervals (e.g., 1-minute, 5-minute, 15-minute, etc.) The reporting may occur in real time or at periodic intervals (e.g., every hour, 2 hours, etc.). The energy management system may be disposed within a building automation system, separate but coupled to the building automation system, or separate and not coupled to the building automation system. The building automation system may be any system within the building that is configured for automatic control of one or more subsystems within the building.

The one or more communication links 123 may comprise physical links such as hard-wired links (e.g., Ethernet, wide area network), land lines, cellular links, other types of wireless links (e.g., Wi-Fi, satellite, IEEE 802.15.4, laser, etc.); or virtual links such as a web interface, electronic mail, text messaging, or postal service; or a combination of physical and virtual links. In addition, each of the nodes 140, 150 may be coupled to the NOC 120 by different types of the physical/virtual communication links 123. That is, one physical node 140 may be coupled via a satellite link and another physical node 140 may be coupled via a cellular link. Likewise, one virtual node 150 may be coupled via email to the NOC 120 and another virtual node 150 may be coupled by postal service.

Each of the virtual nodes 150 may comprise an energy management system as discussed above, or may rely upon local personnel to monitor energy use and provide control for one or more subsystems disposed within a corresponding building. The virtual nodes 150 are only coupled to the NOC 120 via one or more virtual links, and the virtual links may be bidirectional or receive-only at the corresponding building. For receive-only virtual links, transmission of energy use data may be perfected via alternative mechanisms (e.g., power meters) and provided to the NOC 120 via the energy authority 110 in non-real time (e.g., monthly).

The energy authority 110 may comprise a local company, a municipal utility district, a regional transmission organization (RTO), an independent system operator (ISO), or substantially similar energy provider. The energy itself that is provided may comprise electricity, gas, water, or another type of energy source that is generated and consumed. The energy authority 110 may be vested in optimizing transmission and distribution of the energy to the nodes 140, 150, and may further be consigned to reducing or redistributing consumption of the energy at specified times and temperatures (e.g., a demand reduction program event, seasonal peak load reduction), or reducing overall consumption by the nodes 140, 150.

The NOC 120 may be disposed at a third-party energy services company (ESCO) that is contracted by the energy authority 110 for purposes of optimizing transmission and distribution as discussed above. Responsive to constraints of the energy authority 110, the NOC 120 may monitor energy use (directly or indirectly) by the nodes 140, 150, and may transmit messages over the one or more communication links 123 to cause the energy management systems or personnel to directly control one or more of the subsystems disposed within the corresponding buildings (e.g., "increase temperature in refrigeration units at midnight for six hours"), to indirectly control one or more of the subsystems disposed within the corresponding buildings (e.g., "suggest increasing temperature in refrigeration units at midnight for six hours"), or to indirectly affect energy usage of one or more of the subsystems within the corresponding building (e.g., "Upgrading refrigeration systems in your building with more efficient systems will save you 10,000 kWh per month").

Of primary interest to the present disclosure are the messages transmitted by the NOC 120 to the virtual nodes 150, for one skilled in the art will appreciate that monitoring and control of the physical nodes 140 may be perfected more easily when bidirectional communication is accomplished over physical links as opposed to over virtual links, for details about business type (e.g., factory, school, barbershop, small restaurant, etc.) for each corresponding building are generally known by NOC 120, and energy usage by subsystems within the corresponding buildings is directly reported to the NOC 120. However, monitoring and control of subsystems corresponding to the virtual nodes 150 may be quite difficult and open-ended, for reception of messages over the virtual links is subject to access (e.g., opening postal mail, reading email, accessing websites, etc.) and interpretation by personnel, as opposed to automated access and interpretation in the case of physical links and physical nodes 140.

One aspect of selecting appropriate messages to transmit to the nodes 140, 150 involves sufficient knowledge of the type of activity that a corresponding building is conducting. For instance, office buildings are more effectively controlled when messages appropriate for office buildings are selected such as "increase building temperature 2 degrees during summer months" or "upgrade to LED lighting to save 5,000 kWh each month." And small restaurants are more effectively controlled by messages appropriate for small restaurants such as "shifting service hours by one hour later will save you 3,000 kWh per month" or "Are you aware that you are consuming more than twice the electricity of restaurants your size in Detroit?" Thus, for the NOC 120 to select messages appropriate to a business residing in one of the corresponding buildings, it is essential that the type of activity being conducted (or "business type") be known to the NOC 120.

More often than not, business types within buildings corresponding to the one or more virtual nodes are not directly provided by the virtual nodes 150 to the NOC 120. The business types may not be known at all, or they may be obtained indirectly, generally from the energy authority 110. Furthermore, the energy authority 110 may have such type data as part of a utility contract with the businesses, or the energy authority 110 may obtain the type (or "category") data from a category source 111 (e.g., Dunn & Bradstreet, North American Industry Classification System, etc.). And, as one skilled in the art will appreciate, business categories provided by an energy authority 110, whether obtained from the businesses themselves or from a category source 111, are notoriously raft with errors. Yet, it is one of the NOC's primary functions to select messages appropriate for particular businesses according to their corresponding business categories.

The energy authority 110 may provide business names and their corresponding business categories to the NOC 120, or the authority 110 may only provide business names. In the former case, prior to selecting messages to transmit to the businesses corresponding to the nodes 140, 150, the NOC 120 must validate the data provided by the authority 110. For example, the NOC 120 must determine with a high degree of confidence that, say, a business named "Bill's Doc" is indeed a tavern, for it could be a wharf, or a physician's office. Clearly, selection of messages appropriate for energy management of a physician's office would be highly ineffective for a tavern or a wharf.

Accordingly, a present day NOC 120 may comprise the keyword extractor 122 that is coupled to the business category database 121, which processes the business names (BIZNAMES) provided by the energy authority 110, extracting key words or phrases that are highly indicative of a business category. For example, businesses with "church" in their name would be classified by the keyword extractor 122 as a religious institution, and this category would be stored in the database 121 as a potential category for the businesses. Whether comparative categories are provided by the authority 110 or not, the potential categories generated by the keyword extractor 122 are subject to review by the analyst 130 who may detect and correct (if possible) anomalies in the potential categories.

Certainly, the process of determining a business category based on one to just a few words in a business name is not a straightforward task, because frequently businesses have words in their names that are not very indicative of their business category. Consequently, labor required by the one or more analysts 130 is extensive when a given energy management program may include, say, 100,000 businesses. To more clearly described how certain business names may be misclassified by the system 100 of FIG. 1, attention is now directed to FIG. 2.

FIG. 2 is a table 200 depicting exemplary entries in a present day business category database, such as the database 121 of FIG. 1, as provided by an energy authority, or as determined by a keyword extractor. The table 200 includes a plurality of business name entries 201, having a corresponding plurality of business category indicating entries 202, and having a corresponding plurality of business category entries 203. In determining a business category for "FIRST BAPTIST CHURCH," an energy authority, a keyword extractor, or an analyst may determine with a high degree of confidence that a business by such a name is a "RELIGIOUS INSTITUTION." However, if the business category indicating entry, "45607," was inaccurately provided by the energy authority, such may be a source of error. Nevertheless, because the words in "FIRST BAPTIST CHURCH" are very indicative of a "RELIGIOUS INSTITUTION," it is virtually certain that a NOC would select messages for transmission to the FIRST BAPTIST CHURCH that are appropriate and effective for control of energy use by a RELIGIOUS INSTITUTION.

Consider though that "CHURCH CHICKEN" is classified as a "RELIGIOUS INSTITUTION," when it may actually be a small restaurant. Likewise, "CHICKEN ROAD CHURCH" is classified as a "POULTRY FARM," when it might rightly be classified as a religious institution. Accordingly, because the number of words is small in virtually all business names, classification of business names for purposes of selecting appropriate energy use messages is very labor intensive and fraught with error. This is a problem, because energy authorities around the world are hard pressed, both legislatively and popularly, to conserve energy, and to manage energy with diminishing resources. Thus, the labor and corresponding cost associated with business name categorization systems is limiting and disadvantageous.

The present invention overcomes the above noted business name categorization disadvantages and limitations, and others, by providing an apparatus and method for efficient business name categorization which determines business categories for businesses based on name alone at confidences and accuracies much greater than that which has heretofore been provided. The present invention will now be discussed with reference to FIGS. 3-8.

Figure 3:
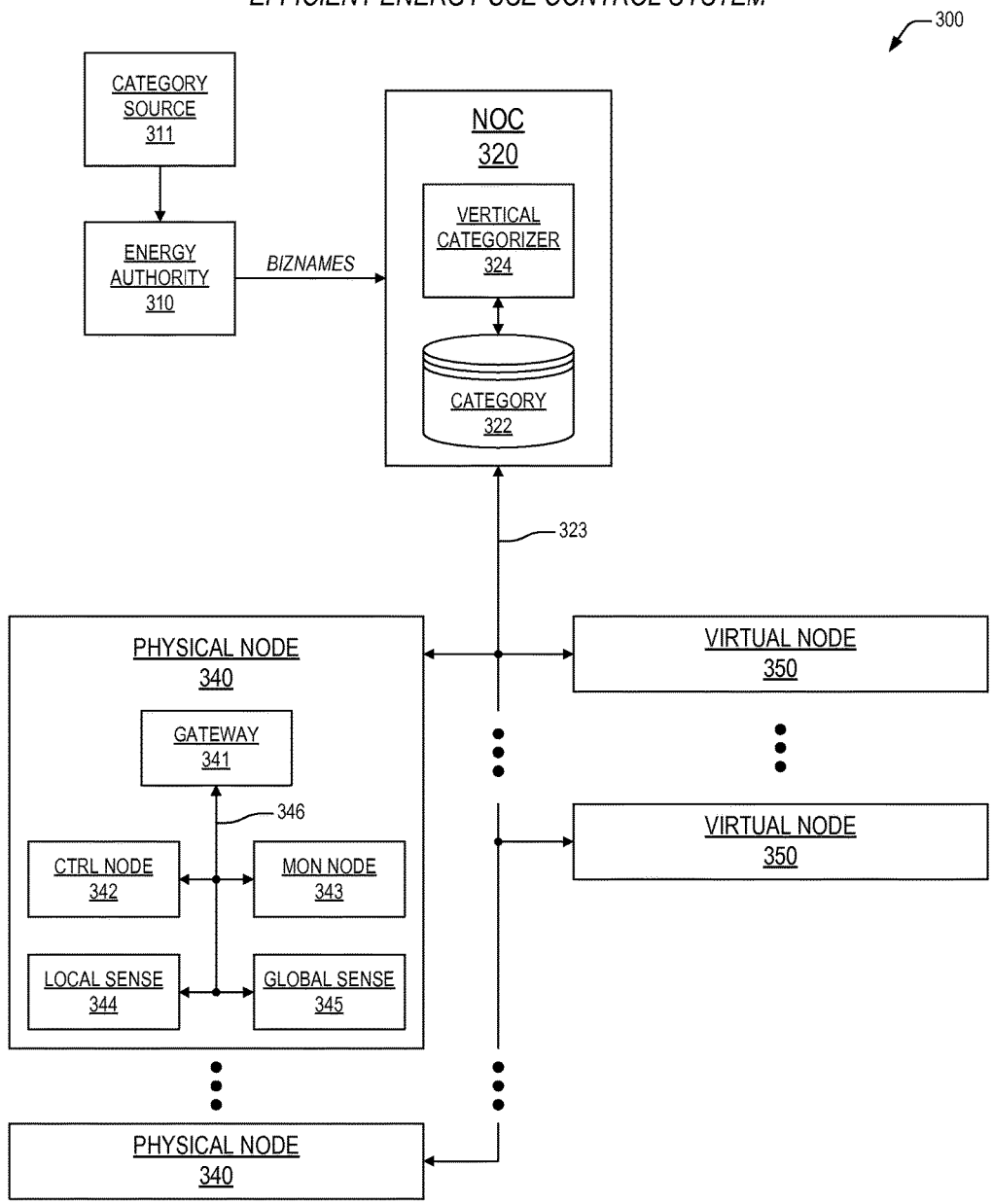
FIG. 3 is a block diagram featuring an efficient energy use control system according to the present invention.

FIG. 3 is a block diagram featuring an efficient energy use control system 300 according to the present invention. The control system 300 has a network operations center (NOC) 320 that is operationally coupled to an energy authority 310. The NOC 320 is further coupled via one or more communication links 323 to one or more physical nodes 340 and one or more virtual nodes 350. The NOC 320 includes a vertical categorizer 324 and a business category database 322. The energy authority 310 may optionally be operationally coupled to a category source 311.

Each of the one or more physical nodes 340 may comprise a gateway 341 that is coupled via an energy coordination network 346 to one or more control nodes 342, one or more monitor nodes 343, one or more local sense nodes 344, and one or more global sense nodes 345. The control nodes 342, monitor nodes 343, local sense nodes 344, and global sense nodes 345 may be configured as an energy management system disposed within a corresponding building that is configured to monitor energy usage by the corresponding building, including usage by one or more subsystems (e.g. air conditioning, refrigeration, heating, heavy equipment, fabrication systems, ovens, human transport, assembly robotics, etc.) within the facility. Each of the control nodes 342 may be coupled to a corresponding controllable subsystem component (not shown), and may be configured to monitor energy use and control operation of the corresponding subsystem component, responsive to messages from the NOC 320. Each of the monitor nodes 343 may be coupled to a corresponding uncontrollable subsystem component (not shown), and may be configured to monitor energy use of the corresponding uncontrollable subsystem component. Each of the local sense nodes 344 may be coupled to sensors (not shown) physically located in proximity of one or more corresponding subsystem components, and configured to sense and report local parameters such as temperature, humidity, occupancy, etc. Each of the global sense nodes 345 may be coupled to sensors (not shown) that are not physically located in proximity of one or more corresponding subsystem components, and configured to sense and report global parameters (i.e., parameters affecting the building in whole or in part) such as, but not limited to, outside temperature, outside humidity, sunlight patterns, etc.

Via the gateway 341, energy usage and monitored local and global parameters are reported to the NOC 320 at specified intervals (e.g., 1-minute, 5-minute, 15-minute, etc.) The reporting may occur in real time or at periodic intervals (e.g., every hour, 2 hours, etc.). The gateway 341, network 346, and nodes 342-345 may be disposed within a building automation system, separate but coupled to the building automation system, or separate and not coupled to the building automation system. The gateway 341 may comprise any well known device capable of perfecting communication of energy use data, control data, and messages to/from the NOC 320, and also capable of perfecting communications between all of the nodes 342-345 over the network 346.

The one or more communication links 323 may comprise physical links such as, but not limited to, hard-wired links (e.g., Ethernet, wide area network), land lines, cellular links, other types of wireless links (e.g., Wi-Fi, satellite, IEEE 802.15.4, laser, etc.); virtual links such as a web interface, electronic mail, text messaging, or postal service; or a combination of physical and virtual links. In addition, each of the nodes 340, 350 may be coupled to the NOC 320 by different types of the physical/virtual communication links. That is, one physical node 340 may be coupled via a satellite link and another physical node 340 may be coupled via a cellular link. Likewise, one virtual node 350 may be coupled via email to the NOC 320 and another virtual node 350 may be coupled by postal service.

Each of the virtual nodes 350 may comprise an energy management system as discussed above with reference to FIG. 1, or may rely upon local personnel to monitor energy use and provide control for one or more subsystems disposed within a corresponding building. The virtual nodes 350 are only be coupled to the NOC 320 via one or more virtual links, and the virtual links may be bidirectional or receive-only at the corresponding building. For receive-only virtual links, transmission of energy use data may be perfected via alternative mechanisms (e.g., power meters) and provided to the NOC 320 via the energy authority 310 in non-real time.

The energy authority 310 may comprise a local company, a municipal utility district, a regional transmission organization (RTO), an independent system operator (ISO), or substantially similar energy provider. The energy itself that is provided may comprise electricity, gas, water, or another type of energy source that is generated and consumed. The energy authority 310 may be vested in optimizing transmission and distribution of the energy to the nodes 340, 350 and may further be consigned to reducing or redistributing consumption of the energy at specified times and temperatures (e.g., a demand reduction program event, seasonal peak load reduction), or reducing overall consumption by the nodes 340, 350.

The NOC 320 may be disposed at a third-party energy services company (ESCO) that is contracted by the energy authority 310 for purposes of optimizing transmission and distribution as discussed above. Responsive to constraints of the energy authority 310, the NOC 320 may monitor energy use (directly or indirectly) by the nodes 340, 350, and may transmit messages over the one or more communication links 323 to cause the nodes 342-345, the energy management system, or personnel to directly control one or more of the subsystems disposed within the corresponding buildings (e.g., "increase temperature in refrigeration units at midnight for six hours"), to indirectly control one or more of the subsystems disposed within the corresponding buildings (e.g., "suggest increasing temperature in refrigeration units at midnight for six hours"), or to indirectly affect energy usage of one or more of the subsystems within the corresponding building (e.g., "Upgrading refrigeration systems in your building with more efficient systems will save you 10,000 kWh per month").

Business types for the corresponding buildings may not be known at all, or they may be obtained indirectly, generally from the energy authority 310. Furthermore, the energy authority 310 may have such type data as part of a utility contract with the businesses, or the energy authority 310 may obtain the type (or "category") data from a category source 311 as noted above.

To determine appropriate messages to send to the nodes 340, 350, the NOC 320 may include the vertical categorizer 324 that is coupled to the business category database 322, which processes the business names (BIZNAMES) provided by the energy authority 310. The vertical categorizer 324 is configured to generate business categories for each of the business names with such a high degree of confidence that an analyst is not required to validate the categories. The vertical categorizer 324 stores the business names and corresponding business categories in the business category database 322.

In one embodiment, the NOC 320 may generate and maintain a system energy use model comprising an aggregate of global energy use models for each of the corresponding buildings. Via the communication links 323 the NOC may transmit a corresponding global energy use model to a corresponding building along with messages configured to control one or more subsystems within the corresponding buildings. Each physical node 340 having a gateway 341 and nodes 342-345 may distributed copies of the corresponding global energy use model to all of the nodes 342-345 for purposes of effective control of the corresponding building's subsystems in the presence of latency and errors occurring over the network 346. In one embodiment, the energy coordination network 346 comprises an IEEE 802.15.4 packetized wireless data network as is well understood by those skilled in the art. Alternatively, the energy coordination network 346 is embodied as an IEEE 802.11 packetized wireless or wired network. In another embodiment, the energy coordination network 346 comprises a power line modulated network comporting with HOMEPLUG® protocol standards. Other packetized network configurations are additionally contemplated.

Figure 4:
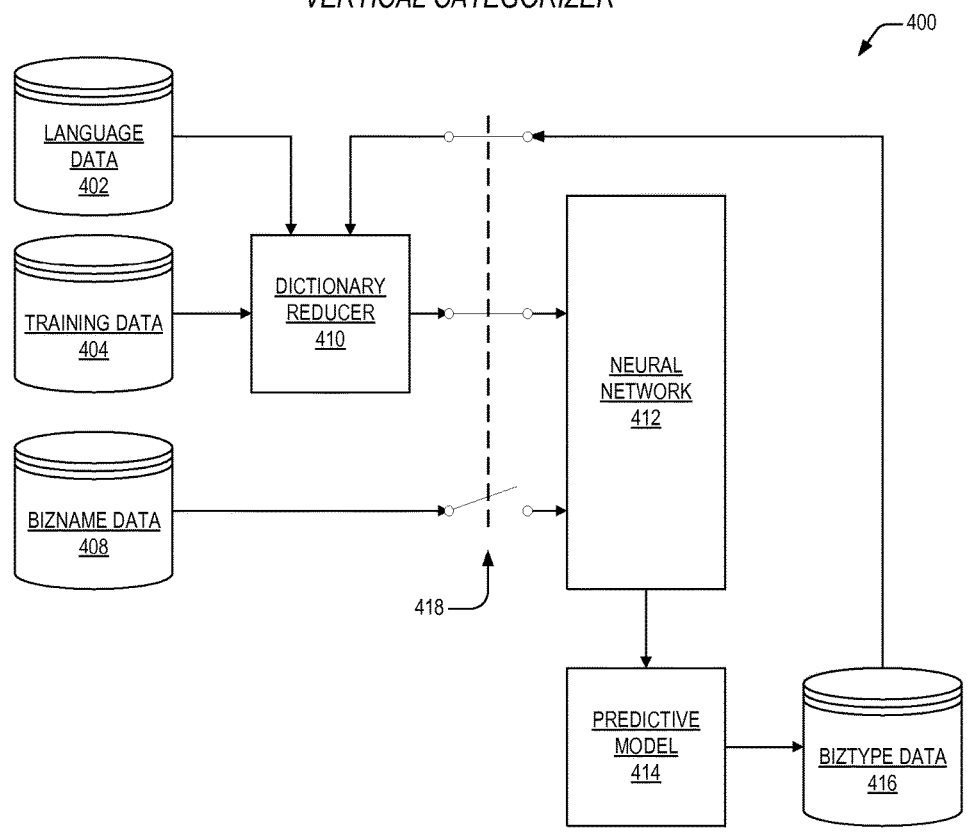
FIG. 4 is a block diagram showing a vertical categorizer for employment within the control system of FIG. 3.

Turning now to FIG. 4, a block diagram is presented showing a vertical categorizer 400 for employment within the control system 300 of FIG. 3. The categorizer 400 may comprise a neural network 412 that is coupled to a predictive model 414, a business name database 408, and a dictionary reducer 410. The predictive model 414 is coupled to a business type database 416. The business type database 416 is also coupled to the dictionary reducer 410. The dictionary reducer 410 is also coupled to a language database 402 and to a training data database 404. The training data database 404 includes a statistically significant number of known business names along with their corresponding correct business categories. In one embodiment, a statistically significant number of known business names comprises over 10,000 different words. The language data database 402 comprises most of the words in a given language.

In operation, the neural network 412 is employed to utilize one or more well known machine learning techniques such as, but not limited to supervised and unsupervised learning algorithms, ensemble algorithms, association rule algorithms, and regression algorithms, in order to process a plurality of training data names provided by the training data database 404 in order to assign weights for each of the terms within the training data names, where a given weight is indicative of a given term's likelihood of correlating to a specific business category. In one embodiment, the weights may comprise values to indicate that a term is very likely, likely, or not likely to be correlated to a business category. For instance, the term "church" may be processed in from the training data names such that it is assigned a weight indicating that it is very likely to be correlated to a "religious institution" business category.

In iterative fashion, the training data names and weights generated by the neural network 412 are provided to the predictive model 414, which is configured to utilize well known machine learning techniques to generate one or more business categories for each of the training data names along with a confidence level for each of the one or more business categories. For example, based upon one iteration's weights, the predictive model 414 may generate an output for training data name "Chicken Church" as being business category "Religious Institution" with 95 percent confidence and "Small Restaurant" with 5 percent confidence. The vertical categorizer 400 is configured to iteratively update the weights and business category predictions using the training data names until a specified level of predicted business categories matches the correct business categories provided by the training data database. When the specified level is reached, the categorizer 400 is considered trained, and parameters of the neural network 412 and predictive model 414 are set.

Following iterative training of the categorizer 400, a virtual switch 418 is employed to begin processing of the business names provided by the business name database 408. Using the set parameters (e.g., weights, etc.), the neural network 412 and predictive model 414 are employed in like manner as above to generate one or more business categories for each of the business names along with a confidence level for each of the one or more business categories, thus eliminating the need for analyst intervention.

As one skilled in the art will appreciate, to generate business categories for, say, 100,000 business names using only 200,000 English language words would require more working memory (not shown) than is reasonable for such purposes and would take on the order of days to process. In contrast, to process those 100,000 business names using only 20,000 English language words would not require more memory than a typical present day desktop computer, and would require on the order of hours to process. Accordingly, the dictionary reducer 410 is provided according to the present invention to eliminate terms present in the training data names that do not significantly affect the accuracy of business category predictions, and to furthermore preserve terms in the training data names that are essential to the accuracy of business category predictions. In one embodiment, the terms may comprise single words. In another embodiment the terms may also comprise bigrams or trigrams of the single words. In a further embodiment, the terms may also comprise word order. In yet another embodiment, the terms may also comprise parts of speech for the words. Other embodiments contemplate terms of a combination of the aforementioned embodiments.

The dictionary reducer 410 is configured to iteratively eliminate terms from the language data 402 such that a prescribed performance metric is achieved for the vertical categorizer. If the business types predicted from the training data names are not within an acceptable range of accuracy when compared to the correct business types, then the dictionary reducer 410 is configured to add terms previously deleted from the language data in order to increase the accuracy of predicted business types when compared to the correct business types. In one embodiment, terms are iteratively added back into the language data according to a computed correlation score, which represents their impact in correlating business names to business categories, as will be discussed in further detail below. When the accuracy of predicted business types when compared to correct business types is achieved, the dictionary reducer 410 freezes the language data as a reduced dictionary, and provides the reduced dictionary to the neural network 412 for processing of business names from the business name database 408.

The dictionary reducer 410 is also configured to create synthetic business names under conditions where one or more of the correct business types are underrepresented, that is, when the number of known business names in the training database 404 corresponding to the one or more of the correct business types is substantially fewer than a average number of known business names corresponding to the other correct business types. The creation of synthetic business names is performed subsequent to elimination of terms from the language data 402.

The vertical categorizer 400 according to the present invention is configured to perform the functions and operations as discussed above. The categorizer 400 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the categorizer 400 may be shared with other circuits, microcode, etc., that are employed to perform other functions and/or operations within the categorizer 400. According to the scope of the present application, microcode is a term employed to refer to a plurality of micro instructions.

Figure 5:
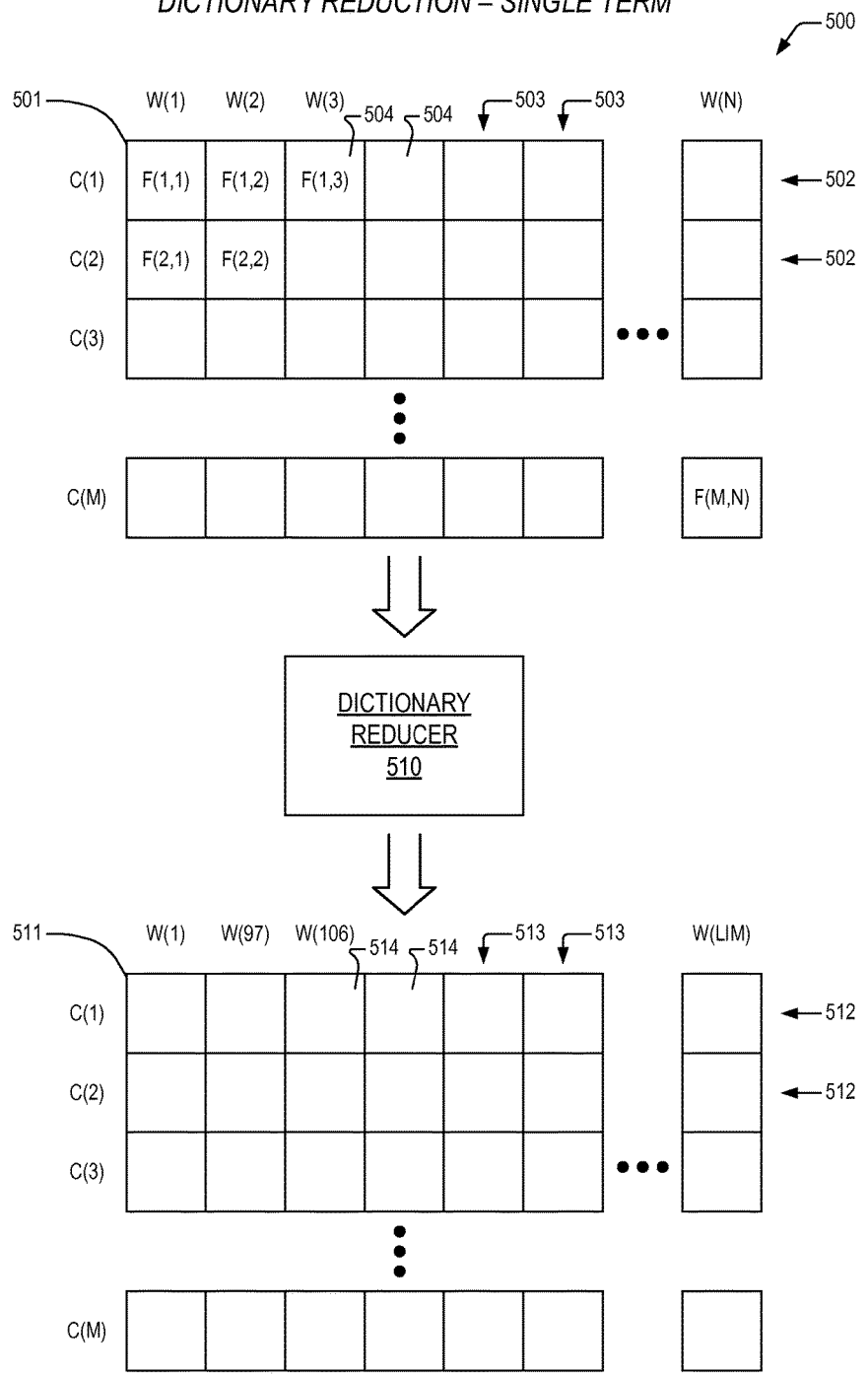
FIG. 5 is a block diagram illustrating operation of a dictionary reducer according to the present invention.

Now referring to FIG. 5, a block diagram 500 is presented illustrating operation of a dictionary reducer 510 according to the present invention, such as the dictionary reducer 410 of FIG. 4. The diagram 500 depicts an initial term dictionary matrix 501, that is provided to a dictionary reducer 510 according to the present invention, and a reduced dictionary matrix 511 that is generated by the dictionary reducer 510, where the reduced dictionary matrix 511 comprises terms essential to accurately determining business categories for training data names, and where processing of the training data names by a vertical categorizer according to the present invention meets specified performance criteria such as, but not limited to, throughput, processing time, and memory requirements.

The initial dictionary matrix 501 comprises M business category rows 502 (C(1):C(M)) that are each associated with a corresponding business category (e.g., religious institution, barbershop, small office, dry cleaners, grocery store, etc.) within the training data. The initial dictionary matrix 501 also comprises N term columns 503 (W(1):W(N)) that are each associated with a corresponding business name term (e.g., The, Dave, Church, Ranch, Groceries, And, Texas, Thumb, Gas, etc.) within the training data names. A cell 504 within a particular row 502 contains a frequency value F indicating the number of times its corresponding word is used within the training data names for businesses whose business category corresponds to the column 503 within which the cell 504 is located. For example, if column W(3) represents the word "church" and row C(45) represents business category "religious institution," then a frequency value F(45,3) equal to 17,047 indicates that the word "church" is employed 17,047 times as part of a name for businesses who are known to be "religious institutions."

As noted above with reference to FIG. 4, this initial dictionary 501 is input to the dictionary reducer 510, which iteratively eliminates terms (i.e., columns 503) from the language data such that a prescribed performance metric is achieved and iteratively adds back terms previously deleted terms in the case that accuracy of predicted business categories is unacceptable. When both accuracy and performance metrics are achieved, the dictionary reducer 510 generates the reduced dictionary matrix 511, and the reduced dictionary matrix 511 may be employed by the vertical categorizer 400 of FIG. 4 for use in determining business categories for business names from the business name database 408.

The reduced dictionary matrix 511 comprises M business category rows 512 (C(1):C(M)) that are each associated with a corresponding business category (e.g., religious institution, barbershop, small office, dry cleaners, grocery store, etc.) within the training data. But in contrast to the initial dictionary matrix 501, the reduced dictionary matrix 511 only comprises LIM term columns 513 that are each associated with a corresponding business name term (e.g., The, Dave, Church, Ranch, Groceries, And, Texas, Thumb, Gas, etc.) within the training data names which has not been eliminated by the dictionary reducer 510. Like the initial dictionary matrix 501, a cell 514 within a particular row 512 contains a frequency value F indicating the number of times its corresponding word is used within the training data names for businesses whose business category corresponds to the column 513 within which the cell 514 is located.

Advantageously, the dictionary reducer 510 according to the present invention operates to eliminate terms that would otherwise be employed by the vertical categorizer, where eliminated terms are judged to be unessential for use in determining a particular business category that corresponds to a given business name. As one skilled in the art will appreciate, English-language words such as "the" and "and" would perhaps be eliminated, for these words are not in the least indicative of any business category.

As noted above with reference to FIG. 4, the dictionary reducer 410 is also configured to create synthetic business names under conditions where one or more of the correct business types are underrepresented, that is, when the number of known business names in the training database 404 corresponding to the one or more of the correct business types is substantially fewer than a average number of known business names corresponding to the other correct business types. As one skilled in the art will appreciate, for unbalanced training sets (e.g., 10,000 restaurants, and 1,000 hair dressers), the neural network 412 would generate business category "restaurant" for every business name in the training data 404, and would be mostly correct. However, to increase the accuracy of the neural network 412, the dictionary reducer 410 is also configured to synthesize data to render members of each business category in the training data 404 balanced in number following elimination of terms from the language data 404.

Consider that each known business name in the training data 402 may be expressed as a LIM-length vector, where LIM is the number of terms in the reduced dictionary 511, and where values within the cells of the LIM-length vector indicate the number of times that the terms corresponding to the cells are employed in the known business name. Since most business names employ single instances of terms (e.g., "United States Post Office"), the values within corresponding cells would each be equal to one. And for business names employing terms more than once, the values within corresponding cells would be equal to the number of times the terms are employed in the business name. To synthesize business names for an underrepresented business category in the training data 404, a prescribed number of nearest neighbor LIM-length vectors are chosen for each of the LIM-length vectors in the underrepresented business category, where a nearest neighbor LIM-length vector exhibits a small Euclidian distance from the LIM-length vector under consideration relative to Euclidian distances corresponding to other LIM-length vectors. For each of the LIM-length vectors, a random number N of these prescribed number of nearest neighbor LIM-length vectors are selected, where N is a proportion value for which the underrepresented business category is to be expanded via the creation of synthetic business names. For example, for 10,000 restaurants and 1,000 hair dressers, N is 9, representing a 900% increase business names corresponding to hair dressers. Next, the cell values in corresponding to each of the LIM-length vectors are subtracted from the cell values in each of the N selected nearest neighbor LIM-length vectors, and the result of the subtraction is multiplied by a random number between 0 and 1. The result of the random number multiplication is added to the cell values of each of the LIM-length vectors to yield N synthesized business names, thus increasing the number of business names in the underrepresented business category.

Figure 6:
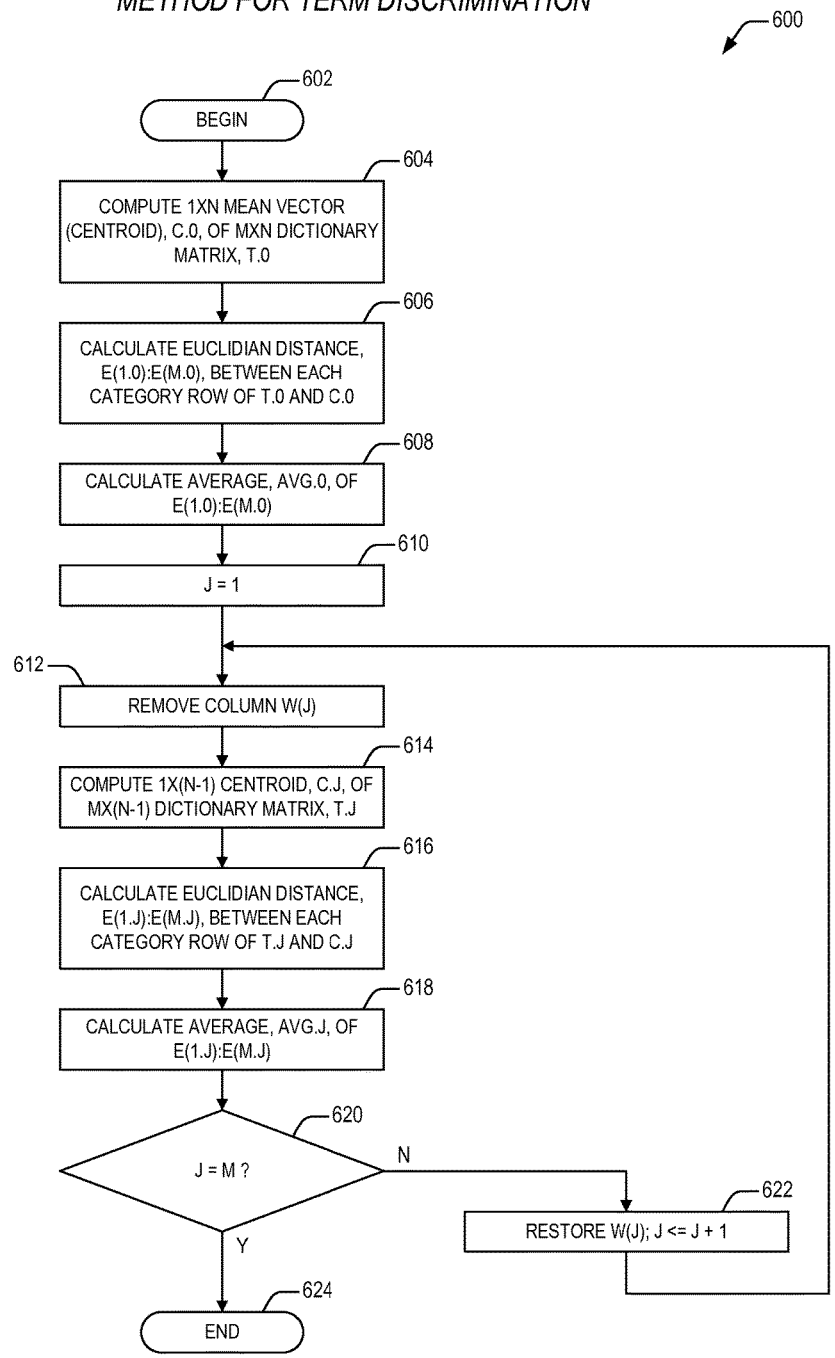
FIG. 6 is a flow diagram detailing a term discrimination method according to the present invention.

Turning now to FIG. 6, a flow diagram 600 is presented detailing a term discrimination method according to the present invention. Flow begins at block 602 where an initial M×N Dictionary T.0 of training data terms is generated as is discussed above with reference to FIG. 5. Flow then proceeds to block 604.

At block 604, a 1×N mean vector (i.e., centroid) C.0 is computed for T.0. Flow then proceeds to block 606.

At block 606, the Euclidian distance is computed between each category row of T.0 and the centroid C.0. This computation yields an M×1 distance vector E(1.0):E(M.0). Flow then proceeds to block 608.

At block 608, an average AVG.0 of the values of the distance vector E(1.0):E(M.0) is calculated, and flow proceeds to block 610.

At block 610, a counter J is set to a value of 1. Flow then proceeds to block 612.

At block 612, column W(J) is removed from the initial dictionary matrix T.0. This represents removal of a corresponding term. Flow then proceeds to block 614.

At block 614, a 1×(N−1) centroid C.J is computer for the resulting reduced M×(N−1) matrix T.J. Flow then proceeds to block 616.

At block 616, the Euclidian distance is computed between each category row of T.J and the centroid C.J. This computation yields an M×1 distance vector E(1.J):E(M.J). Flow then proceeds to block 618.

At block 618, an average AVG.J of the values of the distance vector E(1.J):E(M.J) is calculated, and flow proceeds to block 620.

At block 620, an evaluation is made to determine whether J is equal to the number of terms M in the initial dictionary matrix. If so, then flow proceeds to block 624. If not, then flow proceeds to block 622.

At block 622, column W(J) is restored to the dictionary matrix, and counter J is incremented by one. Flow then proceeds to block 612.

At block 624, the method completes.

Figure 7:
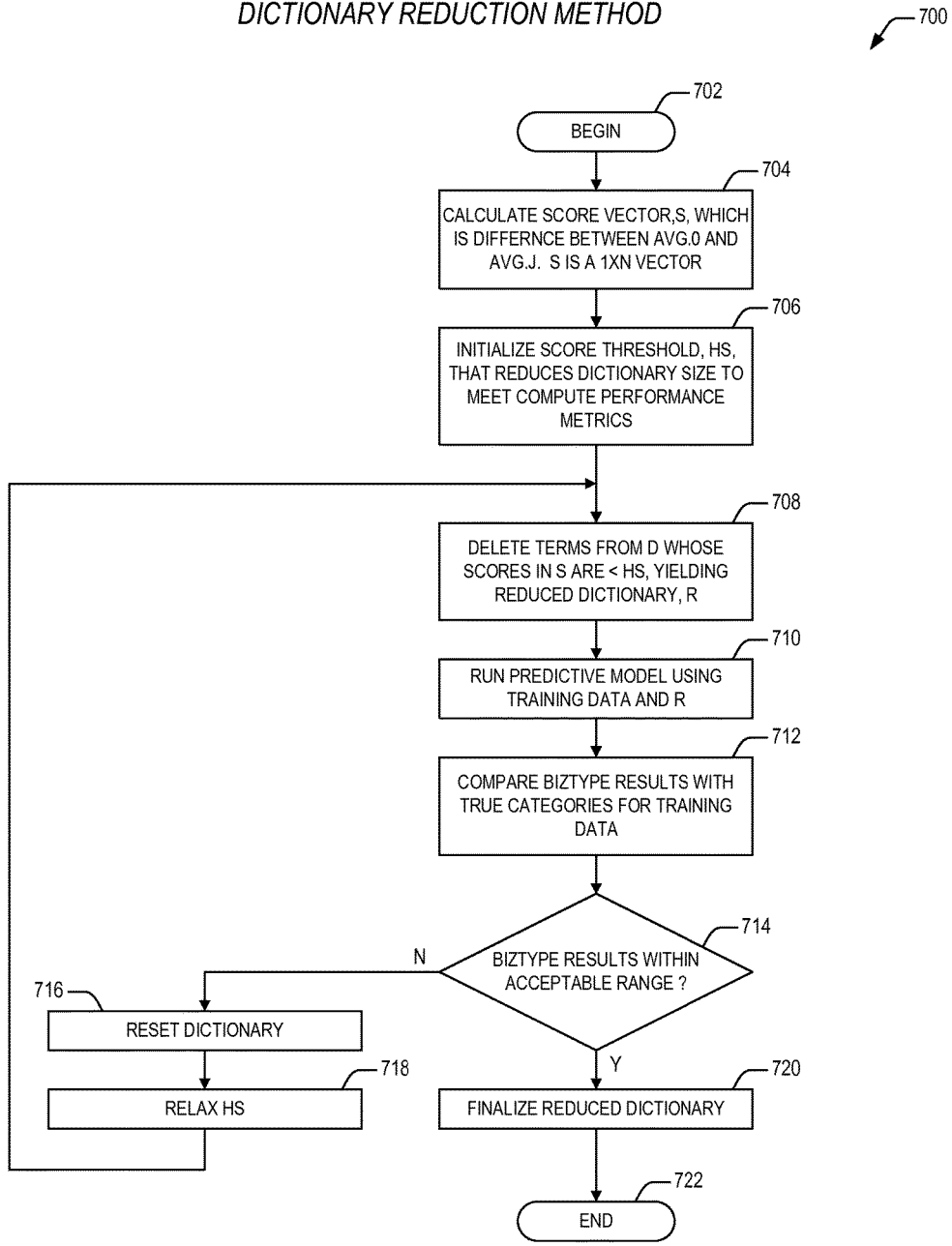
FIG. 7 is a flow diagram detailing a dictionary reduction method according to the present invention.

FIG. 7 is a flow diagram 700 detailing a dictionary reduction method according to the present invention. Flow begins at block 702 where the averages AVG.0:AVG.J are provided via the method of FIG. 6. Recall that AVG.0 is average of the values of the distance vector E(1.0):E(M.0) for the initial dictionary matrix, where the value of each of the cells of the distance vector are the Euclidian distance of that particular row of the initial dictionary matrix and the centroid. Flow then proceeds to block 704.

At block 704, a 1×N score vector S is calculated, where the value of each cell in S is the difference between AVG.0 and the average AVG.J for the M×(N−1) dictionary having term W(J) removed. Thus the score vector S is indicative of how essential a particular term W(J) is to determination of a business category. A very small score entry indicates that removal of a corresponding term W(J) did not significantly shift the centroid C.0, and thus the term W(J) is a candidate for reduction of the dictionary. Conversely, a very high score entry indicates that removal of a corresponding term W(J) did significantly shift the centroid C.0, and thus the term W(J) should not be a candidate for reduction of the dictionary. Flow then proceeds to block 706.

At block 706, a score threshold HS is initialized. HS is set to a value that reduces the size of the initial dictionary such that performance metrics of the vertical categorizer, as discussed above, are achieved. Flow then proceeds to block 708.

At block 708, all terms having a score less than HS are deleted from the initial dictionary D, yielding a reduced dictionary R. Flow then proceeds to block 710.

At block 710, the predictive model 414 is run on training data names retrieved from the training data database 404 using only the terms in reduced dictionary R. Flow then proceeds to block 712.

At block 712, business categories generated by the predictive model 414 are compared to the correct business categories retrieved from the training data database 404. Flow then proceeds to decision block 714.

At decision block 714, an evaluation is made to determine if the results of the comparison of block 712 are within an acceptable range. In one embodiment, an acceptable range is achieved if 97 percent of predicted business categories match their corresponding correct business categories. Other acceptable ranges are contemplated. If acceptable, then flow proceeds to block 720. If unacceptable, then flow proceeds to block 716.

At block 716, the dictionary is reset to its initial state D. Flow then proceeds to block 718.

At block 718, since predicted results were not acceptable, the value of the threshold HS is relaxed (i.e., decreased) to allow for a larger reduced dictionary, thus increasing the accuracy of predicted business categories for the training data names. Flow then proceeds to block 708.

At block 720, the reduced dictionary R is finalized for use on business names other than the training data names. Flow then proceeds to block 722.

At block 722, the method completes.

As noted above in the discussion with reference to FIG. 4, terms of a dictionary for use by the vertical categorizer 400 may comprise single words. However, accuracy may be increase by utilizing, in addition to single words, terms comprising bigrams (or trigrams) of the single words, ordering of the single words, and their parts of speech. In order to illustrate how dictionary reduction is accomplished for these cases, attention is now directed to FIG. 8.

Figure 8:
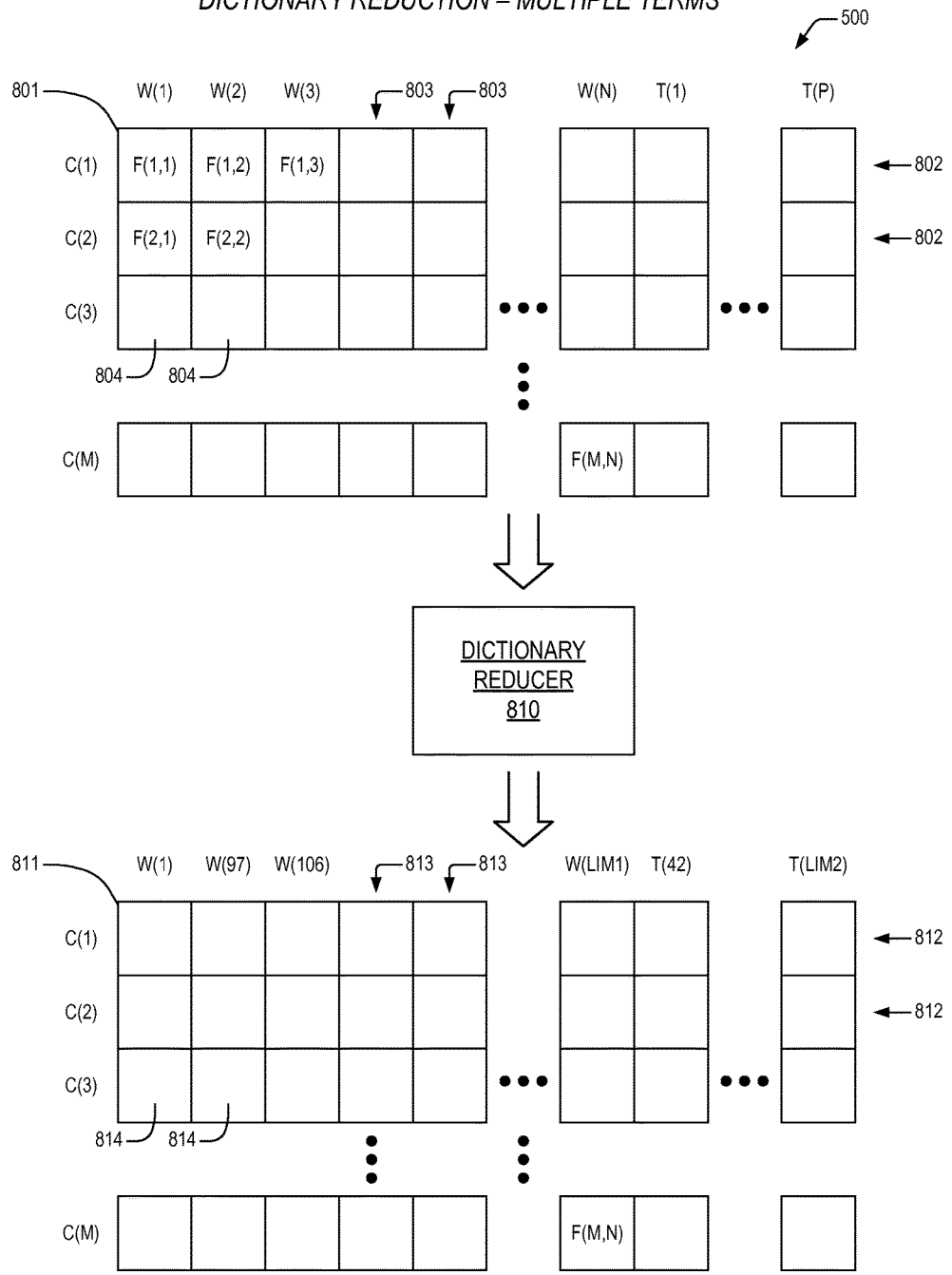
FIG. 8 is a block diagram showing operation of a multi-term dictionary reducer according to the present invention.

FIG. 8 is a block diagram 800 showing operation of a multi-term dictionary reducer 810 according to the present invention, such as the dictionary reducers 410, 510 of FIGS. 4-5. The diagram 800 depicts an initial term dictionary matrix 801 that is provided to the multi-term dictionary reducer 810, and a reduced dictionary matrix 811 that is generated by the multi-term dictionary reducer 810, where the reduced dictionary matrix 811 comprises terms essential to accurately determining business categories for training data names, and where processing of the training data names by a vertical categorizer according to the present invention meets specified performance criteria such as, but not limited to, throughput, processing time, and memory requirements.

The initial dictionary matrix 801 comprises M business category rows 802 (C(1):C(M)) that are each associated with a corresponding business category (e.g., religious institution, barbershop, small office, dry cleaners, grocery store, etc.) within the training data. The initial dictionary matrix 801 also comprises N+P term columns 803 (W(1):W(N) and T(1):T(P)). Columns W(1):W(N) are each associated with a corresponding business name term (e.g., The, Dave, Church, Ranch, Groceries, And, Texas, Thumb, Gas, etc.) within the training data names. Columns T(1):T(P) are each associated with a corresponding additional business name term corresponding to the training data names. In one embodiment, T(1):T(P) comprise bigrams of the corresponding business name terms. In another embodiment, T(1):T(P) comprise trigrams of the corresponding business name terms. In one embodiment, T(1):T(P) comprise W(1):W(N) paired with the different parts of speech of W(1):W(N) that are employed in corresponding business names. In a further embodiment, T(1):TP comprise business names, corresponding addresses, and zoning.

For columns W(1):W(N), a cell 504 within a particular row 502 contains a frequency value F indicating the number of times its corresponding word is used within the training data names for businesses whose business category corresponds to the column 503 within which the cell 504 is located. For example, if column W(3) represents the word "church" and row C(45) represents business category "religious institution," then a frequency value F(45,3) equal to 17,047 indicates that the word "church" is employed 17,047 times as part of a name for businesses who are known to be "religious institutions."

For columns T(1):T(P), a cell 504 within a particular row 502 contains a frequency value F indicating the number of times its multiple term (e.g., bigram, single word and paired part of speech, business name/address/zoning) is used within the training data names for businesses whose business category corresponds to the column 503 within which the cell 504 is located. For example, if column T(3) represents the word "Dog" and part of speech "noun" and row C(45) represents business category "bar," then a frequency value F(45,N+3) equal to 22 indicates that the paired word "Dog" and part of speech "noun" is employed 22 times as part of a name for businesses who are known to be "bars." In another example, if column T(4) represents the word "House" and word order "second" and row C(45) represents business category "department store," then a frequency value F(45,N+3) equal to 17 indicates that the word "House" is employed 17 times as the second word as part of a name for businesses who are known to be "department stores."

As noted above with reference to FIG. 4, this initial dictionary 801 is input to the dictionary reducer 810, which iteratively eliminates terms (i.e., columns 803) from the language data such that a prescribed performance metric is achieved and iteratively adds back terms previously deleted terms in the case that accuracy of predicted business categories is unacceptable. When both accuracy and performance metrics are achieving, the dictionary reducer 810 generates the reduced dictionary matrix 811, and the reduced dictionary matrix 811 may be employed by the vertical categorizer 400 of FIG. 4 for use in determining business categories for business names from the business name database 408.

The reduced dictionary matrix 811 comprises M business category rows 812 (C(1):C(M)) that are each associated with a corresponding business category (e.g., religious institution, barbershop, small office, dry cleaners, grocery store, etc.) within the training data. But in contrast to the initial dictionary matrix 801, the reduced dictionary matrix 811 only comprises LIM1+LIM2 term columns 813 that are each associated with a corresponding business name term (e.g., The, Dave, Church, Ranch, Groceries, And, Texas, Thumb, Gas, etc.) or business name multiple term within the training data names which has not been eliminated by the dictionary reducer 810. Like the initial dictionary matrix 801, a cell 514 within a particular row 812 contains a frequency value F indicating the number of times its corresponding word or multiple term is used within the training data names for businesses whose business category corresponds to the column 813 within which the cell 813 is located.

As noted above with reference to FIG. 4, the dictionary reducer 410 is also configured to create synthetic business names under conditions where one or more of the correct business types are underrepresented, that is, when the number of known business names in the training database 404 corresponding to the one or more of the correct business types is substantially fewer than a average number of known business names corresponding to the other correct business types. As one skilled in the art will appreciate, for unbalanced training sets (e.g., 10,000 restaurants, and 1,000 hair dressers), the neural network 412 would generate business category "restaurant" for every business name in the training data 404, and would be mostly correct. However, to increase the accuracy of the neural network 412, the dictionary reducer 410 is also configured to synthesize data to render members of each business category in the training data 404 balanced in number following elimination of terms from the language data 404.

Consider that each known business name in the training data 402 may be expressed as a LIM+LIM2-length vector, where LIM+LIM2 is the number of terms in the reduced dictionary 511, and where values within the cells of the LIM+LIM2-length vector indicate the number of times that the terms corresponding to the cells are employed in the known business name. Since most business names employ single instances of terms (e.g., "United States Post Office"), the values within corresponding cells would each be equal to one. And for business names employing terms more than once, the values within corresponding cells would be equal to the number of times the terms are employed in the business name. For multiple terms (e.g., bigrams, trigrams, term and part of speech, term and word order), the values within corresponding cells would also be equal to the number of times the multiple terms are employed in the business name.

To synthesize business names for an underrepresented business category in the training data 404, a prescribed number of nearest neighbor LIM LIM+LIM2 length vectors are chosen for each of the LIM+LIM2-length vectors in the underrepresented business category, where a nearest neighbor LIM+LIM2-length vector exhibits a small Euclidian distance from the LIM+LIM2-length vector under consideration relative to Euclidian distances corresponding to other LIM+LIM2-length vectors. For each of the LIM+LIM2-length vectors, a random number N of these prescribed number of nearest neighbor LIM+LIM2-length vectors are selected, where N is a proportion value for which the underrepresented business category is to be expanded via the creation of synthetic business names. For example, for 10,000 restaurants and 1,000 hair dressers, N is 9, representing a 900% increase business names corresponding to hair dressers. Next, the cell values in corresponding to each of the LIM+LIM2-length vectors are subtracted from the cell values in each of the N selected nearest neighbor LIM+LIM2-length vectors, and the result of the subtraction is multiplied by a random number between 0 and 1. The result of the random number multiplication is added to the cell values of each of the LIM+LIM2-length vectors to yield N synthesized business names, thus increasing the number of business names in the underrepresented business category.

One advantage is that the vertical categorizer according to the present invention is capable, after training, of processing new business name data to determine corresponding business categories absent any analyst input.

Another advantage of the present invention is that accurate control messages may by selected for transmission to both physical and (more importantly) virtual nodes comprising an energy use control system, where new business names can be dynamically added by an energy authority, and accurate control messages can be generated for transmission to the businesses.

A further advantage of the present invention eliminates manual (i.e., analyst) validation of business categories resulting from present day keyword searches.

Yet another advantage of the present invention is that dictionary reduction techniques for both single and multiple terms allows for practical implementation of a vertical categorizer within a NOC that does not require extensive memory or processing capabilities.

Portions of the present invention and corresponding detailed description are presented in terms of software, or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, may refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. An energy management system, for communicating with one or more buildings for purposes of managing energy consumption of devices within the buildings, the energy management system comprising:
   a neural network, configured to iteratively calculate weights, resulting in a final set of said weights, for each of a plurality of single-word terms and trigram terms taken from training data business names, wherein each of said weights is indicative of a likelihood of correlating one of a plurality of business categories, and wherein said trigram terms each comprise three consecutive ones of said single-word terms as used in said training data business names;
   a predictive model, coupled to said neural network, configured to iteratively employ sets of said weights to predict a first corresponding one of said plurality of business categories for each of said training data business names until employment of said final set of said weights accurately predicts a correct business category for said each of said training data business names, and configured to subsequently employ said final set of said weights to predict a second corresponding one of said plurality of business categories for each of a plurality of operational business names; and
   a dictionary reducer, coupled to said neural network, configured to eliminate unessential single-word terms and trigram terms taken from said training data business names, wherein the unessential single-word terms and trigram terms are not indicative of any of the plurality of business categories, to determine said plurality of single-word terms and trigram terms, wherein said plurality of single-word terms and trigram terms are essential to predicting said correct business category for said each of said training data business names.

2. The energy management system as recited in claim 1, wherein if one set of said weights does not provide for accurate prediction of a correct business category for said each of said training data business names, then said dictionary reducer includes formerly eliminated single-word terms and trigram terms to determine said plurality of single-word terms and trigram terms until accurate prediction of a correct business category for said each of said training data business names is achieved.

3. The energy management system as recited in claim 1, wherein said dictionary reducer eliminates said unessential single-word terms and trigram terms taken from said training data business names to determine said plurality of single-word terms and trigram terms as a function of a performance metric corresponding to a vertical categorizer within which said neural network, said predictive model, and said dictionary reducer are disposed.

4. The energy management system as recited in claim 1, wherein said dictionary reducer generates score vectors for all single-word terms and trigram terms taken from said training data business, wherein a given score vector indicates a degree to which removal of a corresponding single-word term affects determination of said correct business category.

5. The energy management system as recited in claim 1, wherein said second corresponding one of said plurality of business categories for each of a plurality of operational business names is employed within a network operations center (NOC) to determine and transmit to the buildings messages appropriate for managing energy consumption of devices within the buildings.

6. The energy management system as recited in claim 5, wherein said messages are transmitted over physical communication links to physical nodes within some of the buildings.

7. The energy management system as recited in claim 5, wherein said messages are transmitted over virtual communication links to virtual nodes within some of the buildings.

8. An energy management system, for communicating with one or more buildings for purposes of managing energy consumption of devices within the buildings, the energy management system comprising:
   a network operations center (NOC), coupled to each of the buildings via one or more communication channels, said NOC comprising:

a neural network, configured to iteratively calculate weights, resulting in a final set of said weights, for each of a plurality of single-word terms and trigram terms taken from training data business names, wherein each of said weights is indicative of a likelihood of correlating one of a plurality of business categories, and wherein said trigram terms each comprise three consecutive ones of said single-word terms as used in said training data business names;

a predictive model, coupled to said neural network, configured to iteratively employ sets of said weights to predict a first corresponding one of said plurality of business categories for each of said training data business names until employment of said final set of said weights accurately predicts a correct business category for said each of said training data business names, and configured to subsequently employ said final set of said weights to predict a second corresponding one of said plurality of business categories for each of a plurality of operational business names; and a dictionary reducer, coupled to said neural network, configured to eliminate unessential single-word terms and trigram terms taken from said training data business names, wherein the unessential single-word terms and trigram terms are not indicative of any of the plurality of business categories, to determine said plurality of single-word terms and trigram terms, wherein said plurality of single-word terms and trigram terms are essential to predicting said correct business category for said each of said training data business names.

9. The energy management system as recited in claim 8, wherein if one set of said weights does not provide for accurate prediction of a correct business category for said each of said training data business names, then said dictionary reducer includes formerly eliminated single-word terms and trigram terms to determine said plurality of single-word terms and trigram terms until accurate prediction of a correct business category for said each of said training data business names is achieved.

10. The energy management system as recited in claim 8, wherein said dictionary reducer eliminates said unessential single-word terms and trigram terms taken from said training data business names to determine said plurality of single-word terms and trigram terms as a function of a performance metric corresponding to a vertical categorizer within which said neural network, said predictive model, and said dictionary reducer are disposed.

11. The energy management system as recited in claim 8, wherein said dictionary reducer generates score vectors for all single-word terms and trigram terms taken from said training data business, wherein a given score vector indicates a degree to which removal of a corresponding single-word term affects determination of said correct business category.

12. The energy management system as recited in claim 8, wherein said second corresponding one of said plurality of business categories for each of a plurality of operational business names is employed by said NOC to determine and transmit to the buildings messages appropriate for managing energy consumption of devices within the buildings.

13. The energy management system as recited in claim 12, wherein said communication links comprise physical communication links, and wherein said messages are transmitted over said physical communication links to physical nodes within some of the buildings.

14. The energy management system as recited in claim 12, wherein said communication links comprise virtual communication links, and wherein said messages are transmitted over said virtual communication links to virtual nodes within some of the buildings.

15. A method for communicating with one or more buildings for purposes of managing energy consumption of devices within the buildings, the method comprising:

via a neural network, iteratively calculating weights, resulting in a final set of the weights, for each of a plurality of single-word terms and trigram terms taken from training data business names, wherein each of the weights is indicative of a likelihood of correlating one of a plurality of business categories, and wherein said trigram terms each comprise three consecutive ones of said single-word terms as used in said training data business names;

via a predictive model coupled to the neural network, iteratively employing sets of the weights to predict a first corresponding one of the plurality of business categories for each of the training data business names until employment of the final set of the weights accurately predicts a correct business category for the each of the training data business names, and subsequently employing the final set of the weights to predict a second corresponding one of the plurality of business categories for each of a plurality of operational business names; and via a dictionary reducer coupled to the neural network, eliminating unessential single-word terms and trigram terms taken from the training data business names, wherein the unessential single-word terms and trigram terms are not indicative of any of the plurality of business categories, to determine the plurality of single-word terms and trigram terms, wherein the plurality of single-word terms and trigram terms is essential to predicting the correct business category for the each of the training data business names.

16. The method as recited in claim 15, wherein if one set of the weights does not provide for accurate prediction of a correct business category for the each of the training data business names, then the dictionary reducer includes formerly eliminated single-word terms and trigram terms to determine the plurality of single-word terms and trigram terms until accurate prediction of a correct business category for the each of the training data business names is achieved.

17. The method as recited in claim 15, wherein the dictionary reducer eliminates the unessential single-word terms and trigram terms taken from the training data business names to determine the plurality of single-word terms and trigram terms as a function of a performance metric corresponding to a vertical categorizer within which the neural network, the predictive model, and the dictionary reducer are disposed.

18. The method as recited in claim 15, wherein the dictionary reducer generates score vectors for all single-word terms and trigram terms taken from the training data business, wherein a given score vector indicates a degree to which removal of a corresponding single-word term affects determination of the correct business category.

19. The method as recited in claim 15, wherein the second corresponding one of the plurality of business categories for each of a plurality of operational business names is employed within a network operations center (NOC) to determine and transmit to the buildings messages appropriate for managing energy consumption of devices within the buildings.

20. The method as recited in claim 19, wherein the messages are transmitted over physical communication links to physical nodes within some of the buildings.

21. The method as recited in claim 19, wherein the messages are transmitted over virtual communication links to virtual nodes within some of the buildings.

* * * * *